United States Patent

[11] 3,620,206

[72] Inventors William B. Harris, Jr.
Huntsville;
William B. Harris, Bryan; Richard R. Davison, Bryan, all of Tex.
[21] Appl. No. 22,315
[22] Filed Mar. 24, 1970
[45] Patented Nov. 16, 1971
[73] Assignee The United States of America as represented by the Secretary of the Interior

[54] FLUID HEATING BY RADIATION
11 Claims, 3 Drawing Figs.
[52] U.S. Cl. .................................................. 126/271
[51] Int. Cl. .................................................. F24j 3/02
[50] Field of Search ......................................... 126/270, 271

[56] References Cited
UNITED STATES PATENTS
3,146,774 9/1964 Yellott .................. 126/271
3,200,820 8/1965 Garrett ................... 126/271
3,077,190 2/1963 Allen ..................... 126/271
3,215,134 11/1965 Thomason ............... 126/271
3,252,456 5/1966 Bohn, Jr. ................ 126/271

FOREIGN PATENTS
994,106 8/1951 France .................. 126/271

Primary Examiner—Charles J. Myhre
Attorneys—Ernest S. Cohen and Roland H. Shubert ABSTRACT: Radiant energy is used to heat a liquid by passing the liquid between two level, flat, heat exchange surfaces, the top surface resting freely on the lower surface and being exposed to the radiant energy. Liquid flows between the surfaces and is maintained in a thin, continuous and substantially uniform film by operation of Bernoulli's Theorem. In a preferred embodiment, water is heated by solar radiation and the heat exchange surfaces float on a reservoir of the water being heated.

PATENTED NOV 16 1971

INVENTORS
WILLIAM B. HARRIS, JR.
WILLIAM B. HARRIS, SR.
RICHARD R. DAVISON

BY Ernest S. Cohen
Roland H. Shubert
ATTORNEYS

FLUID HEATING BY RADIATION

BACKGROUND OF THE INVENTION

Solar energy has long been used as a source of heat for a variety of purposes. A number of different types of solar water heaters have been developed for domestic heating, heating swimming pools, for desalination processes and other processes which can utilize low-grade heat energy.

Previous designs of solar water heaters have suffered from a number of defects. Many designs, such as those incorporating plastic film construction, lack durability. Many durable heater designs, such as some proposed and utilized for building heating, have been too expensive for extensive use. Many of the previous heaters suffered from low efficiency, lacked quickness of response to changing solar conditions and displayed excessive night heat loss.

SUMMARY OF THE INVENTION

It has now been found that a device for the extraction of heat from radiant energy which utilizes the effect of Bernoulli's Theorem increases efficiency of the device and allows more sensitive and faster response to changing levels of incident radiation. In its simplest form, a heat exchange liquid is passed between two relatively rigid, flat surfaces; the top surface being exposed to incident radiation and resting freely on the lower surface. The upper surface is substantially transparent to radiation while the lower surface absorbs radiation. As required by Bernoulli's Theorem, liquid passing between the two surfaces is in the form of a compressed, continuous and relatively uniform film.

In a preferred embodiment of the invention, water is heated by solar radiation. The two surfaces making up the heat extracting portion of the device float on the surface of water storage or reservoir means while the flow of water between the surfaces is controlled responsive to the incident solar radiation.

Hence it is an object of this invention to provide a method and means for extraction of heat from radiant energy.

It is a specific object of this invention to provide a solar water heater having characteristics of high efficiency, low-heat loss and sensitive response to incident radiation intensity.

It is a further object of this invention to provide a process for the recovery of heat from incident solar radiation.

DETAILED DESCRIPTION OF THE INVENTION

The invention will be more clearly understood by reference to the accompanying drawings in which.

Figure 1:
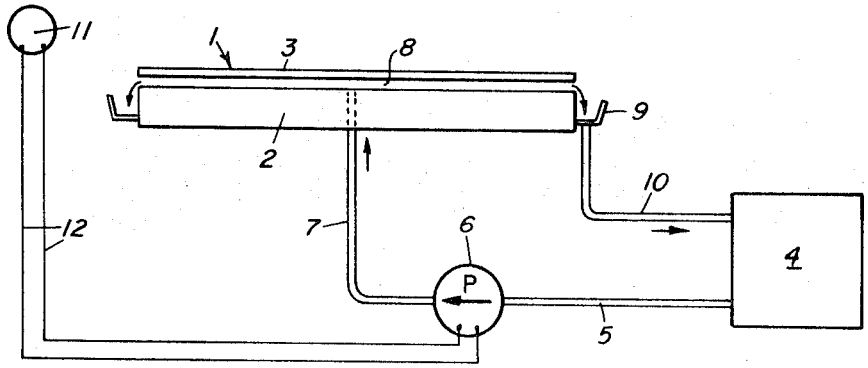
FIG. 1 represents a diagrammatic view of the heat extracting system of this invention.

Referring now to FIG. 1, the heat exchange device, generally designated by the numeral 1, comprises a relatively rigid and flat basal member 2 disposed in a substantially horizontal attitude. Resting on the basal member and conforming generally to the size and shape of that member is cover plate 3. Liquid from supply or storage means 4 passes through conduit 5 to pump 6. From pump 6, the liquid is passed, via conduit 7, to a central area between basal member 2 and cover plate 3. Liquid then flows outwardly toward the periphery of the basal member and cover plate in a thin channel 8 formed between the two. Liquid is recovered in collecting means 9 and is returned to storage means 4 by means of conduit 10.

By operation of Bernoulli's Theorem, liquid flowing through channel 8 is maintained as a compressed, thin and evenly distributed film. As required by that Theorem, if liquid flow tended to channel in one direction, the increased rate of flow would reduce the pressure in the channelling area. Reduction in pressure would in turn cause the cover plate to press more tightly on the basal member in that area thus diverting excess flow to areas of lower flow rate. While FIG. 1 shows liquid being introduced through a central portion of the basal member, this is not necessary to proper functioning of the device. It is also possible to introduce liquid at an edge, but this is a less effective and less preferred arrangement.

In operation, cover plate 3 is exposed to an external heat flux such as solar radiation. Liquid, such as water, is passed through the heat exchange device as previously described. The heated liquid may be used for any conventional and appropriate purpose; may be in turn heat-exchanged with another liquid or gas, or may be used as storage means for heat energy.

When the source of external heat flux is variable, such as is solar radiation, radiation-sensitive control device 11 may be connected by means of control wires 12 to control the operation of pump 6. Controlling liquid flow through the heat exchange device responsive to external heat flux changes permits almost instantaneous response to nonheat gain conditions. This rapid response time coupled with the very small quantity of liquid exposed to heat exchange conditions results in large efficiency gains.

Figure 2:
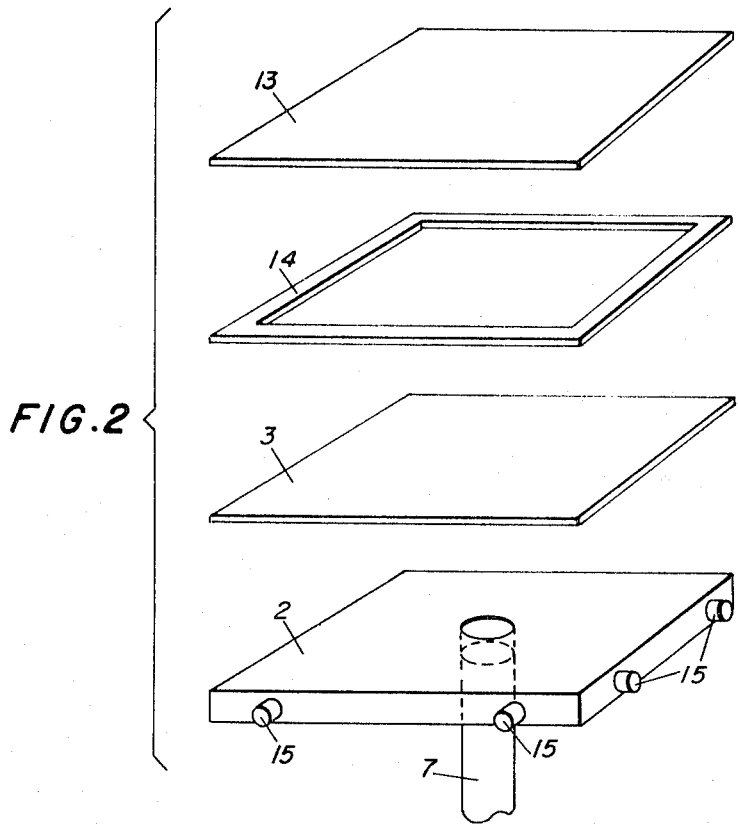
FIG. 2 is an oblique, exploded view of a preferred embodiment of a single heat exchange module.

Turning now to FIG. 2, there is shown an oblique, exploded view of one preferred embodiment of this invention. In this embodiment, basal member 2 is constructed of a material, such as foam glass, having insulating properties and having a specific gravity less than that of the liquid being circulated. Cover plate 3 comprises a relatively flat and transparent material resting directly on the basal member and conforming in size and shape to that member. Plate 3 may be constructed of glass, plastic sheet or plastic film. Generally, a rigid material such as glass is preferred. A second transparent member 13 forms in cooperation with spacer 14 an insulating, dead airspace. Member 13 may comprise a glass plate or may comprise plastic film or similar materials. Liquid is delivered to a central point on the upper surface of basal member 2. Moving liquid forms a thin, relatively uniform film between member 2 and plate 3 and overflows at the edge portions of these two members. The upper surface of member 2 preferably is treated with a dark, heat absorbing coating as is well known in the art.

FIG. 2 represents a single module or unit. When assembled in a multimodule configuration, spacer pegs 15 are provided on the edges of basal member 2. These spacer pegs provide a return channel for the liquid after it is passed through the heat exchange portion of the device. A liquid collection tray may be provided at a level beneath basal member 3 or, in a preferable embodiment, the return channels communicate directly with a liquid storage area. This last embodiment is illustrated in FIG. 3.

Figure 3:
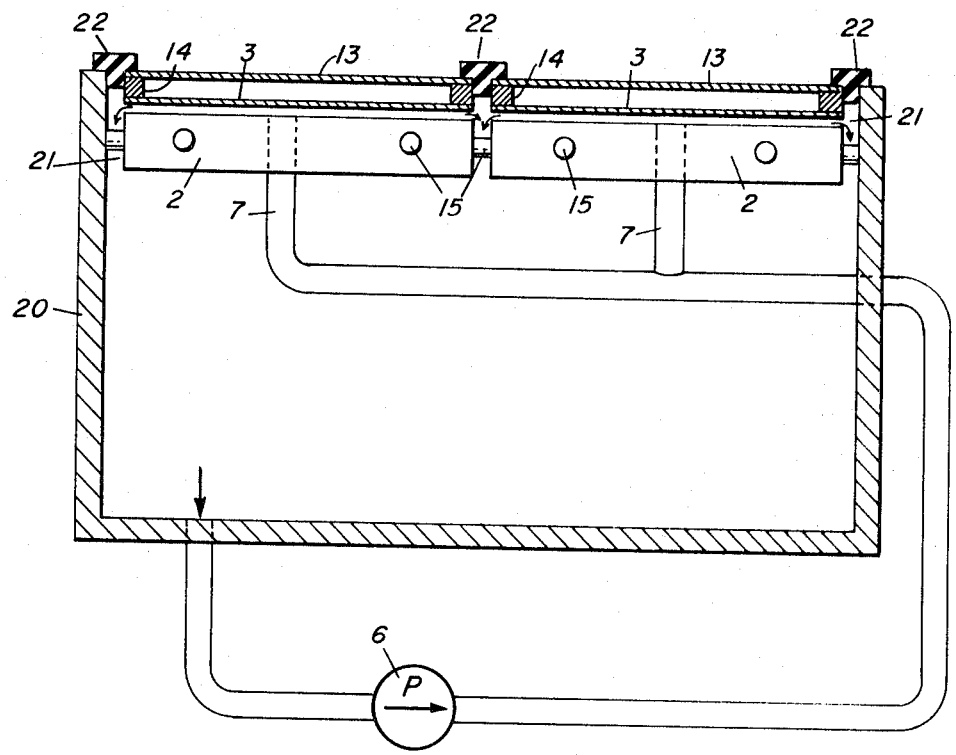
FIG. 3 is a partial sectional view of a multimodule heat exchange device constructed in accordance with the invention.

FIG. 3 represents a partial sectional view of a multimodule heat exchange device in accordance with the invention. Liquid storage means 20, preferably constructed of a material having heat-insulating properties, is substantially completely filled with the liquid to be heat exchanged. Floating on and supported by the liquid are a plurality of heat exchange modules such as are represented in FIG. 2.

Each module comprises a buoyant, basal member 2, a cover plate 3, spacer means 14 and a second transparent member 13. Buoyant basal member 2 is preferably constructed of a material such as foam glass. However, other materials and methods of construction may also be used. For example, member 2 may be constructed of metal or other suitable materials in the form of a flat, hollow, or buoyant-plastic foam-filled float. Spacer pegs 15 maintain the modules in a somewhat separated position thus providing return channels 21 to allow liquid to return to the storage area. Sealing means 22, which may conveniently comprise flexible strips of the configuration, isolate the system from the external environment. Liquid is circulated from a lower region of storage means 20 through conduit 5 to pump 6. Pump 6 then distributes liquid via conduits 7 to the central portions of individual heat exchange modules where the liquid is heated by incident radiation striking basal member 2. As illustrated in FIG. 1, the operation of pump 6 is preferably controlled by a radiation-sensitive control device so that the pump operates only during periods in which incident radiation is of sufficient intensity to cause heating of the circulating liquid. A number of conventional sensors, including thermistors and photosensitive devices of many kinds, may readily be adapted for this purpose.

Heat developed and stored by this system may be used to furnish energy for heating, drying, solvent extraction, desalination or any other process which can utilize heat at temperatures below the boiling point of water. Utilization of the heat energy can be accomplished in any conventional fashion. For example, a secondary heat exchanger may be placed within the liquid stored in means 20. A stream of heated liquid may also be transported from means 20 to a point of utilization. Other means and methods for utilizing the heat energy will be readily apparent to those skilled in the art.

Tests of single and multimodule units, constructed in general accordance with FIG. 3, were performed using solar energy as the source of incident heat flux and water as the liquid medium. Efficiencies as high as about 65 percent of theoretical were attained by these units. Efficiency in this case is defined as gain divided by input multiplied by 100. Input is a measure of local radiant energy available as measured by a device such as the Eppley pyrheliometer while gain is measured by the increased heat content of the circulating water.

What is claimed is:

1. A device for extracting heat from incident radiant energy comprising:
   a. a basal, relatively rigid, flat member normally disposed in a substantially horizontal attitude;
   b. a flat, relatively rigid plate conforming generally to the size and shape of the basal member and resting on that member, said plate being adapted for exposure to incident radiant energy;
   c. means to pass a liquid between the basal member and the plate; and
   d. means at the periphery of the plate and basal member to recover the liquid.

2. The device of claim 1 wherein the top surface of the basal member is adapted to absorb radiant energy.

3. The device of claim 2 wherein the basal member is constructed of a material having thermal insulation properties and having buoyancy relative to said liquid.

4. The device of claim 3 wherein the plate is substantially transparent to the incident radiant energy.

5. The device of claim 4 wherein liquid storage means are disposed below said basal member.

6. The device of claim 5 wherein the basal member is buoyantly supported on the surface of the liquid in said storage means.

7. The device of claim 6 including sensing means adapted to control the passage of liquid between the basal member and the plate responsive to the intensity of incident radiation.

8. The device of claim 7 including a second transparent member spaced above the plate and forming in cooperation with that plate an insulating dead air space.

9. The device of claim 8 including spacer means on the periphery of said basal member to provide a channel for liquid to return to said storage means.

10. A process for heating water by means of solar radiation which comprises passing a flow of water between two relatively rigid, flat surfaces, said surfaces being disposed in a substantially level attitude, the bottom surface comprising a radiation absorbing member and the upper surface comprising a radiation transmitting member, the upper surface being freely supported by the bottom surface, thereby maintaining a compressed, continuous and substantially uniform flowing film of water between the two surfaces.

11. The process of claim 10 wherein the flow of water between the two surfaces is controlled responsive to the intensity of incident solar radiation striking the upper surface.

* * * * *